US008053729B2

(12) United States Patent
Ouvrier-Buffet et al.

(10) Patent No.: US 8,053,729 B2

(45) Date of Patent: Nov. 8, 2011

(54) ELECTROMAGNETIC RADIATION DETECTOR WITH NANOWIRE CONNECTION AND METHOD FOR PRODUCING SAME

(75) Inventors: Jean-Louis Ouvrier-Buffet, Sevrier (FR); Jean-Antoine Gruss, Seyssinet-Pariset (FR)

(73) Assignee: Commissariat a l'Energie Atomique, Paris (FR)

(*) Notice: Subject to any disclaimer, the term of this patent is extended or adjusted under 35 U.S.C. 154(b) by 457 days.

(21) Appl. No.: 12/289,596

(22) Filed: Oct. 30, 2008

(65) Prior Publication Data

US 2009/0140145 A1 Jun. 4, 2009

(30) Foreign Application Priority Data

Nov. 12, 2007 (FR) ..................................... 07 07917

(51) Int. Cl.
*G01J 1/00* (2006.01)
*G01J 5/00* (2006.01)

(52) U.S. Cl. ................................. 250/338.1; 250/336.1

(58) Field of Classification Search ............... 250/336.1, 250/338.1

See application file for complete search history.

(56) References Cited

U.S. PATENT DOCUMENTS 6,996,147 B2 2/2006 Majumdar et al.
2005/0112872 A1 5/2005 Okamura et al.
2005/0128788 A1* 6/2005 Segal et al. .................. 365/151
2006/0266402 A1* 11/2006 Zhang et al. ................. 136/205
2007/0205364 A1 9/2007 Ouvrier-Buffet et al.
2008/0142066 A1* 6/2008 Plissonnier et al. .......... 136/200
2009/0020148 A1* 1/2009 Boukai et al. ................. 136/201
2010/0056892 A1* 3/2010 Ben-Barak et al. ........... 600/354

FOREIGN PATENT DOCUMENTS

EP 1 653 205 A1 5/2006

OTHER PUBLICATIONS

Abramson et al., "Fabrication and Characterization of a Nanowire/Polymer-Based Nanocomposite for a Prototype Thermoelectric Device", *Journal of Microelectromechanical Systems*, vol. 3, No. 3, Jun. 2004, pp. 505-513.

Tilke et al., "Fabrication and transport characterization of a primary thermometer formed by Coulomb islands in a suspended silicon nanowire", *Applied Physics Letters*, vol. 82, No. 21, May 2003, pp. 3773-3775.

* cited by examiner

*Primary Examiner* — David Porta
*Assistant Examiner* — Mindy Vu
(74) *Attorney, Agent, or Firm* — Oliff & Berridge, PLC

(57) ABSTRACT

The electromagnetic radiation detector compromises at least one radiation absorption membrane transforming the absorbed energy into heat transmitted to at least one resistive thermometer having a resistance varying with temperature. Each absorption membrane is suspended above a substrate by a nanowire connected to the central area of the membrane. The nanowire comprises an electrically conducting core and an electrically conducting external layer electrically insulated from one another and respectively connected to measuring areas of said thermometer. The nanowire serves the purpose both of support for the membrane and of electrical connection between the measuring areas and a circuit arranged at the level of the substrate.

14 Claims, 5 Drawing Sheets

6
1
8
11
10
9
16b
16a

ELECTROMAGNETIC RADIATION DETECTOR WITH NANOWIRE CONNECTION AND METHOD FOR PRODUCING SAME

BACKGROUND OF THE INVENTION

The invention relates to an electromagnetic radiation detector comprising at least one radiation absorption membrane transforming the absorbed energy into heat transmitted to at least one resistive thermometer having a resistance varying with temperature, the membrane being suspended above a substrate by support means constituting nanowire-based electrical connection means.

The invention also relates to a method for producing one such electromagnetic radiation detector.

STATE OF THE ART

Recent technical progress in silicon micro- and nano-electronics and production of thin layers have given a new boost to the technology of infrared radiation thermal detectors comprising an absorbent membrane also acting as thermometer material or preferably whereon a thermometer material is arranged, the membrane being fixed in suspension above a substrate by support means.

FIGS. 1 and 2 illustrate an electromagnetic radiation detector comprising a membrane 1 that is absorbent with respect to incident electromagnetic radiation and that is maintained in suspension substantially parallel to a substrate 2 by support means. The latter comprise two thermal insulation arms 4, which are also electrically conducting, securedly affixed to membrane 1 and arranged substantially in the plane of membrane 1. Each arm 4 is fixed to substrate 2 by means of a pillar 3 perpendicular to substrate 2 and supporting the membrane. Pillar 3 has to perform both electrical connection and thermal insulation. Due to the effect of the radiation, the membrane heats and transmits its temperature to a thermometer 6 arranged on the membrane, for example a thermistor in the form of a thin layer deposited on the membrane.

Substrate 2 can comprise an electronic circuit integrated on a silicon wafer and comprising on the one hand stimuli circuits and thermometer read circuits, and on the other hand multiplexing components enabling the signals originating from different thermometers to be serialized and transmitted to a reduced number of outputs to be used by a usual imaging system. To improve the sensitivity of the thermal detector, the support means (pillar 3 and arm 4) are designed such as to thermally insulate absorbent membrane 1 from substrate 2, thereby enabling the heat losses of the membrane to be limited, consequently enabling its heating to be preserved.

The electrical connection between thermometer 6 and the read circuits arranged on substrate 2 is generally achieved by means of arms 4 and by metallization of pillars 3.

The document EP 1653205 discloses a bolometric detector with thermal insulation by constriction. As before, this detector comprises pillars 3, designed to keep the active part suspended above the substrate and to perform electrical conduction between the read circuit and the active part. To optimize the thermal insulation, pillars 3 can be extended by microtips or, as in FIG. 3, can support an intermediate frame 5 provided with microtips 7 supporting bolometric membrane 1. Microtips 7 can be formed by carbon nanotubes or nanowires.

OBJECT OF THE INVENTION

One object of the invention is to provide an electromagnetic radiation detector, in particular of bolometer type, presenting good performances and that is easy to produce.

According to the invention, this object is achieved by the fact that, for each membrane, the support means comprise a nanowire connected to an area of said membrane, the nanowire having an electrically conducting core and an electrically conducting external layer electrically insulated from one another and respectively connected to distinct measuring areas of the corresponding thermometer.

It is a further object of the invention to provide a method for producing an electromagnetic radiation detector. This method comprises the following successive steps:

- creation of connection pads at the level of the substrate,
- deposition of a droplet of catalyst on each connection pad,
- growth of the nanowire cores,
- formation of an electrical insulation layer on the core of each nanowire,
- deposition of a polymer resin wherein the nanowire cores covered with the electrical insulation layer are embedded,
- planarization,
- releasing the free ends of the nanowire cores,
- deposition and patterning of an electrically insulating layer constituting the electrically insulating membrane associated with each nanowire,
- removing the polymer resin,
- formation of the electrically conducting external layer of each nanowire and of the thermometer.

BRIEF DESCRIPTION OF THE DRAWINGS

Other advantages and features will become more clearly apparent from the following description of particular embodiments of the invention given for non-restrictive example purposes only and represented in the accompanying drawings, in which.

DESCRIPTION OF PARTICULAR EMBODIMENTS

Figure 1:
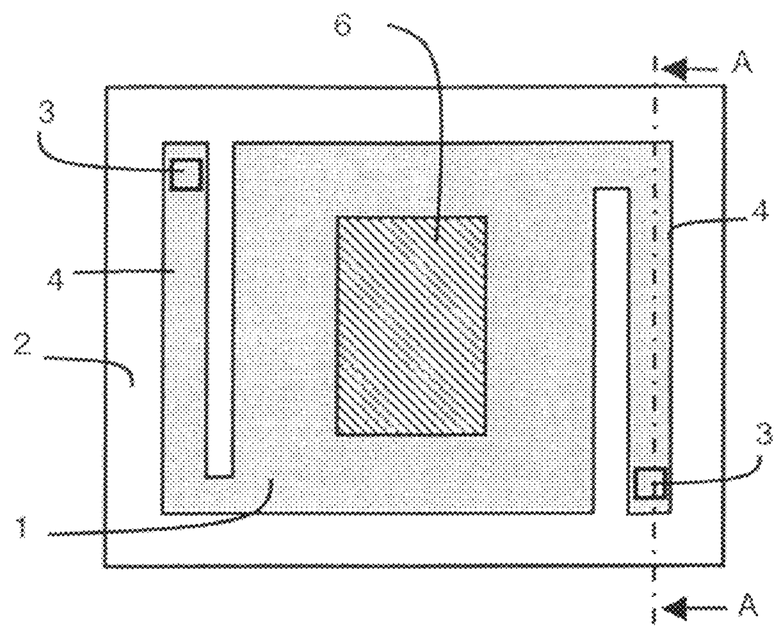
FIG. 1 illustrates a top view of a detector according to the prior art.
Figure 2:
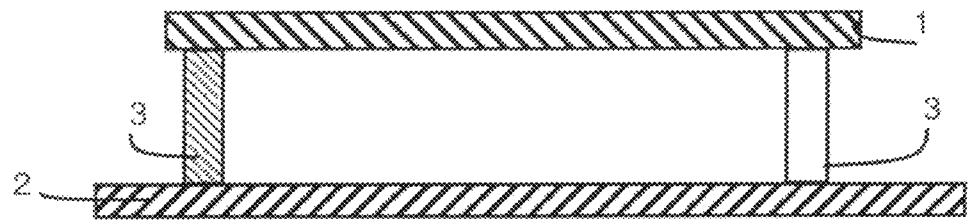
FIG. 2 represents the detector of FIG. 1 in cross section along AA.
Figure 3:
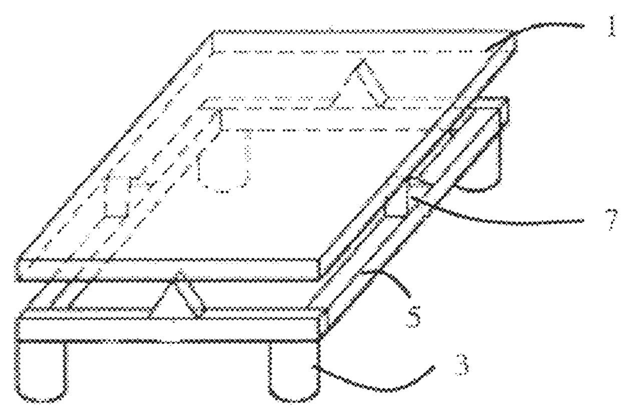
FIG. 3 illustrates another detector according to the prior art.
Figure 4:
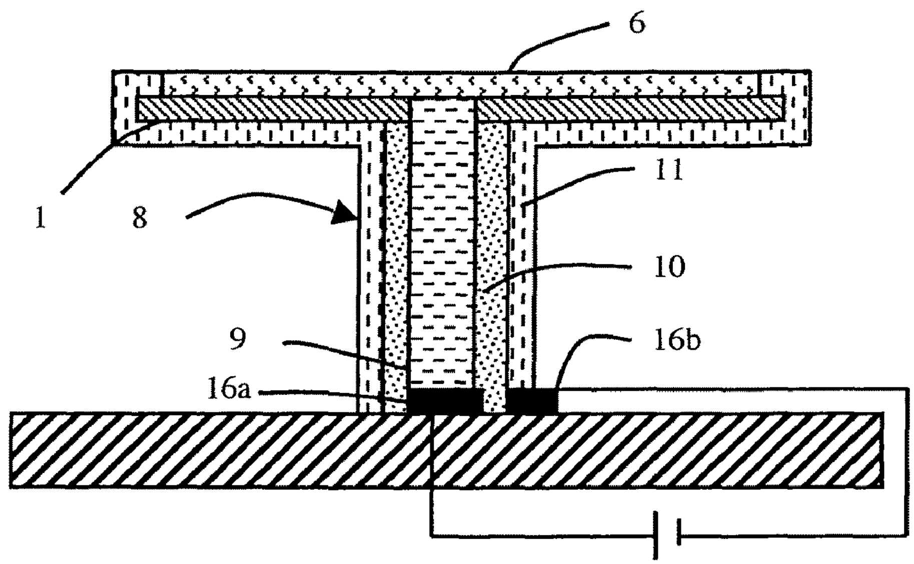
FIG. 4 illustrates an embodiment of a detector according to the invention.
Figure 6:
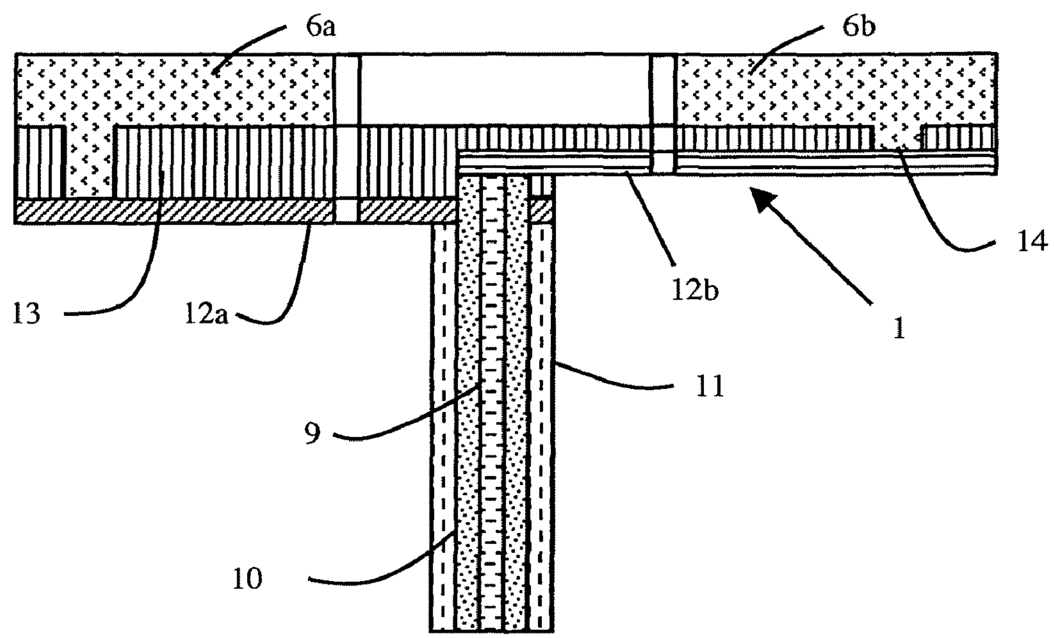
FIG. 6 illustrates a cross sectional view along BB of the detector of FIG. 5.
Figure 7:
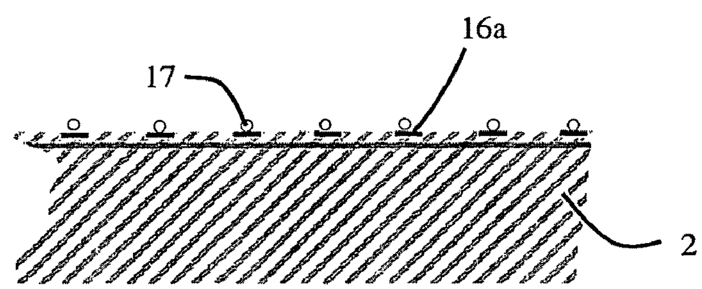
FIGS. 7 to 12 illustrate a method for production of a particular embodiment of a detector according to the invention.
Figure 8:
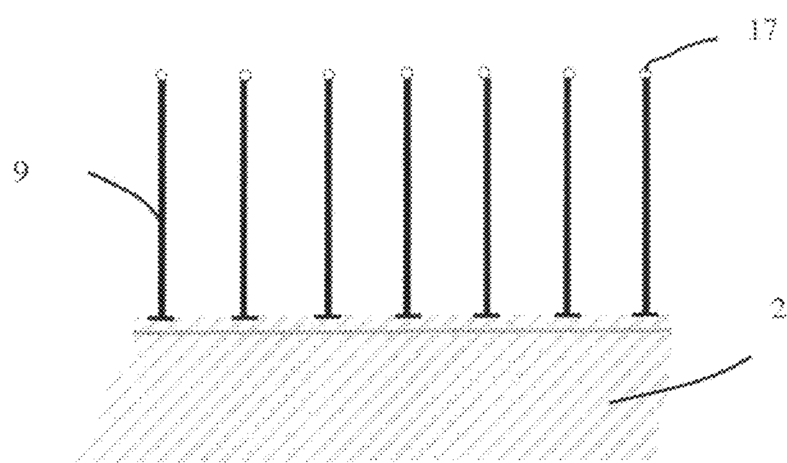
Figure 12:
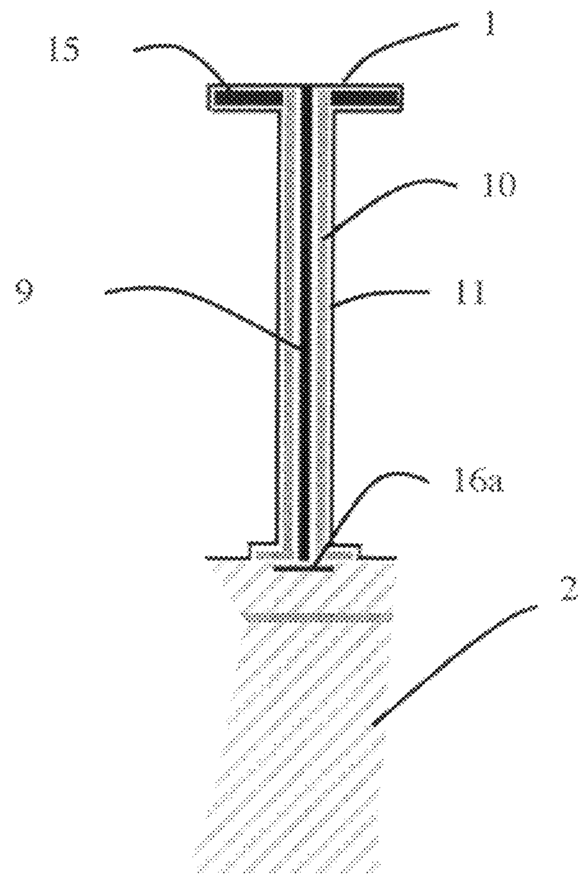

In FIGS. 4, 6 and 12, the electromagnetic radiation detector is a bolometer comprising at least one radiation absorption membrane 1 suspended above a substrate 2 by a single nanowire 8 that assumes both input and return of electric current and support of absorption membrane 1. A thermometer 6 is supported by absorption membrane 1 or is integrated therein. When it heats, absorption membrane 1 transmits its heat to the thermometer which is of resistive type, i.e. its electrical resistance varies in known manner as a function of its heat. Thermometer 6 can be formed by at least one layer or a strip with a high temperature coefficient and low low-frequency noise. The thermometer is connected on the one hand to nanowire core 9 and on the other hand to external layer 11.

Nanowire 8, preferably of circular cross section, is connected to a preferably central area of membrane 1. It comprises an electrically conducting core 9 and an also electrically conducting external layer 11, electrically insulated from one another by an insulator 10. Core 9 and external layer 11 of the nanowire are respectively connected at their ends to distinct measuring areas of thermometer 6 and are respectively connected at their base to connection pads 16*a* and 16*b* formed at the level of the substrate. Pads 16*a* and 16*b* are connected to corresponding connection terminals of a power supply necessary for measuring the temperature.

In an embodiment illustrated in FIG. 4, the mushroom-shaped detector comprises at least one electrically insulating absorption membrane 1 supporting a thermometer 6. Core 9 of nanowire 8 passes through the center of the membrane. The core of the nanowire is in electrical contact with thermometer 6. External layer 11 covers the nanowire and a part of membrane 1 to come into contact with the thermometer, preferably at the periphery of the latter.

Figure 5:
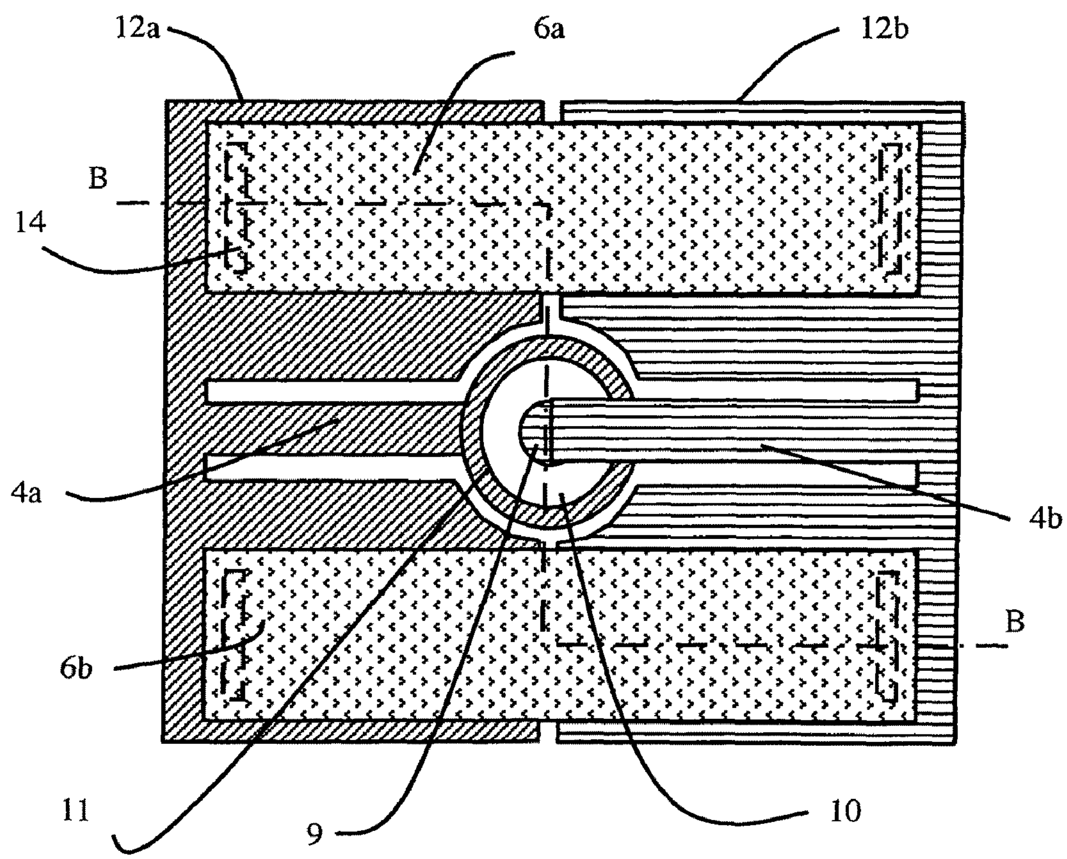
FIG. 5 illustrates a top view of a particular embodiment of a detector according to the invention.

In the preferred embodiment illustrated in FIGS. 5 and 6, core 9 and external layer 11 of nanowire 8 are respectively connected to two electrically conducting parts 12*a* and 12*b* forming absorption membrane 1. The two parts 12*a* and 12*b* act both as electromagnetic radiation absorber and as electricity conductor to supply thermometer 6. Part 12*a* can be connected to core 9 of nanowire by thermal insulation arm 4*a* which is electrically conducting, whereas part 12*b* can be connected to the external layer of the nanowire by a thermal insulation arm 4*b* that is also electrically conducting. Part 12*a* and associated arm 4*a* are electrically insulated from the other part 12*b* and from associated arm 4*b* by an electrically insulating layer 13. Electrically insulating layer 13 comprises at least one opening 14 facing each part 12*a* and 12*b*. In FIGS. 5 and 6, thermometer 6 is composed of two strips 6*a* and 6*b* arranged on electrically insulating layer 13. Each strip is in electrical contact with the two parts 12*a* and 12*b* at the level of openings 14 forming measuring areas. Strips 6*a* and 6*b* are made of high temperature coefficient materials with low low-frequency noise such as amorphous silicon and alloys thereof, vanadium oxide, and more generally, certain transition metal oxides.

In the particular embodiment illustrated in FIG. 12, the detector, which is mushroom-shaped, comprises at least one electrically insulating membrane 15, through the center whereof core 9 du nanowire 8 passes. An electrically conducting layer constitutes external layer 11 of the nanowire and surrounds electrically insulating membrane 15. This electrically conducting layer forms both absorption membrane 1 and thermometer 6 on insulating membrane 15. It is in contact with core 9 of nanowire 8 above insulating membrane 15 and connects the thermometer to the base of the nanowire at the periphery of the nanowire.

In the different particular embodiments described above, as in the embodiment of FIG. 12, a single nanowire 8 both forms a central support pillar for membrane 1 and performs the associated electrical interconnect. The use of a nanowire composed of a coaxial core 9 and external layer 11, electrically conducting and insulated from one another, does in fact enable the nanowire to be used to connect a processing circuit integrated in substrate 2 with two distinct measuring areas of the detector.

A method for producing a detector comprising several elementary mushroom-shaped detectors according to FIG. 12, arranged in the form of an array or matrix, is illustrated in FIGS. 7 to 12.

Figure 9:
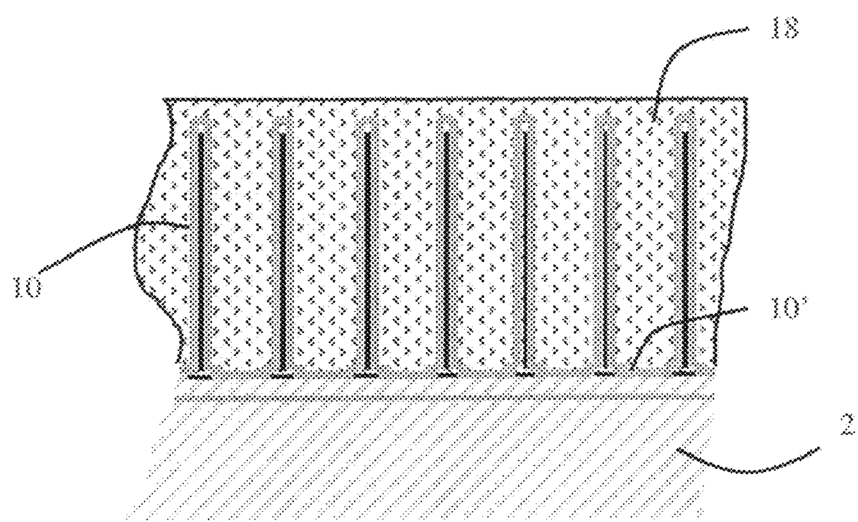
Figure 10:
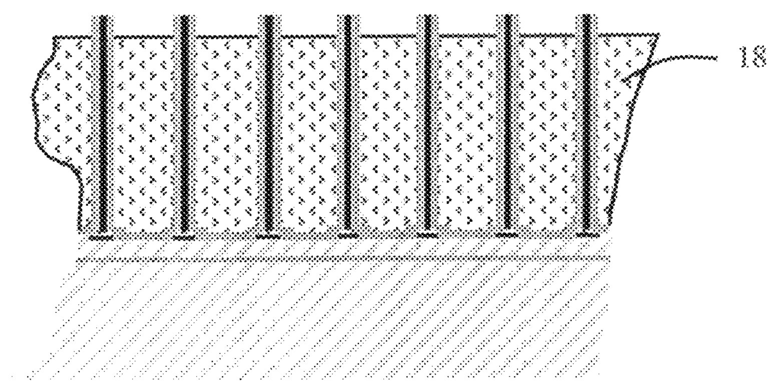
Figure 11:
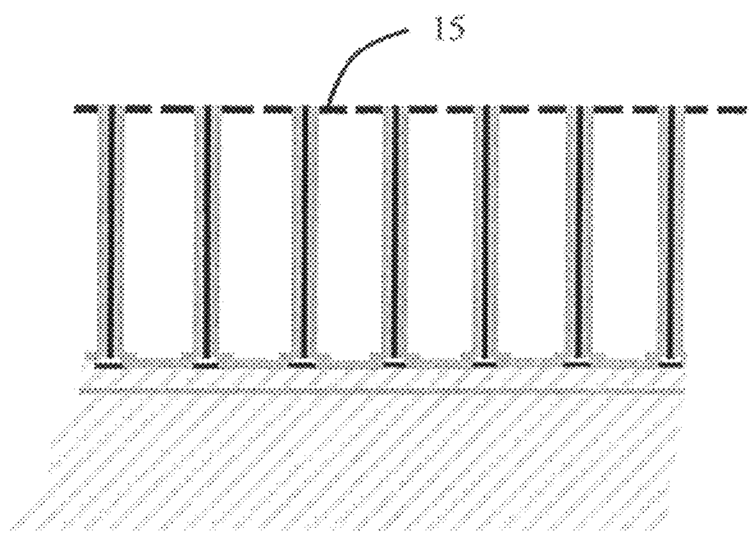

First of all (FIG. 7), connection pads 16*a* are formed at the level of substrate 2 (made of silicon or of SOI type), preferably by localized doping, implantation or epitaxy. Then a droplet of catalyst 17, preferably of gold, is deposited on each connection pad 16*a*. A growth step of a core 9 of a plurality of nanowires 8 preferably made from doped silicon, is then performed (FIG. 8), by the Vapor-Liquid-Solid (VLS) technique. An electrically insulating layer is then formed, preferably by oxidation or silicon oxide deposition. It covers core 9 of each nanowire, thereby forming insulator 10 of the nanowires and covering 10' substrate 2 between two adjacent nanowires (FIG. 9). Then a polymer resin 18 is deposited, burying cores 9 of nanowires 8 covered by electrical insulation layer 10. Resin 18 is for example parylene deposited in vapor phase or by spin-coating. A planarization step is then performed by chemical mechanical polishing, then the free ends (top ends) of core 9 of nanowires 8 are released by chemical or plasma etching (FIG. 10). Insulator 10 is preferably preserved at the salient end of the core of the nanowires. Then (FIG. 11), deposition and patterning of an electrically insulating layer enable an electrically insulating membrane 15 to be formed above each nanowire. Polymer resin 18 is then removed, then electrically conducting external layer 11 and the thermometer are formed.

According to an alternative embodiment (FIG. 12), after polymer resin 18 has been removed, the nanowires are metalized by deposition of an electrically conducting layer, for example by CVD or PCVD. This electrically conducting layer is preferably metallic. It forms both the resistive (thermometer) and absorbent membrane 1 above each membrane 15. If the absorption is not sufficient, it can be envisaged to add an additional layer with a high absorption coefficient on the electrically conducting layer. External layer 11 of each nanowire acts as return electrical interconnect between the nanowire core and the substrate. This same layer connects external layers 11 of the adjacent nanowires in series at the level of the substrate at the base of the nanowires.

According to another alternative embodiment, to obtain the detector illustrated in FIG. 4, after polymer resin 18 has been removed, external layer 11 is formed by PCVD. It covers each nanowire and a part of the associated membrane 1. The thermometer is then formed on membrane 1 at a location left free after etching. The thermometer can also first be formed on membrane 1, then external layer 11 is deposited to cover the nanowires and a part of membrane 1 to come into contact with the thermometer.

Each nanowire 8 has for example a length of 2.5 microns. Its core 9 is made from conducting material, preferably strongly doped semi-conducting material or metal, with a diameter of 15 nm. Electrical insulation layer 10, preferably made from $SiO_2$ has a thickness of 2 nm. External layer 11 of each nanowire is made from conducting material, preferably strongly doped semi-conducting material or metal, with a thickness of 3 nm. Assuming that the thermal resistance of nanowire 8 is equivalent to that of a bulk nanowire of the same diameter, and that Fourier's law which assumes a diffusive behavior of the phonons remains applicable, such a nanowire 8 with a diameter of 25 nm has a thermal conductivity k of about 9.5 W/m.K, i.e. a thermal resistance $Rth=L/kS$.

L being the length of the nanowire and S the cross section of the heat flux passage in the nanowire, about 540 MK/W. This thermal resistance is much higher than that obtained with suspension arms 4 according to the prior art, which is globally about 50 to 100 MK/W.

In the case where core 9 and external layer 11 are made from a strongly doped semi-conductor, the semi-conductor can be chosen from Si, Ge, GaAs, InP, and GaN.

In practice, this thermal resistance may be higher. Electrical insulation layer 10, which accounts for about 20% of the heat flux passage, does in fact have a lower thermal conductivity, about 1 W/m.K, than the thermal conductivity involved above. Furthermore, the annular configuration provides an additional phonon diffusion effect at the interfaces. Doped silicon core 9 can further be produced by axial stacking of heterojunctions whose thermal conductivity is reduced by a factor 2 to 3. This type of heterostructure nanowire is for example described in U.S. Pat. No. 6,996,147. Increasing the length of the nanowire would result in a proportional increase of the thermal resistance, but the price to pay would be a cavity mismatch. For example, for a nanowire with a length of 10 microns, the thermal resistance would be multiplied by 4 and would reach a value of 2140 MK/W.

The small diameter of the nanowires, coupled with a high slenderness ratio made possible by the positioning the nanowire under the corresponding membrane ensures an excellent thermal insulation, much better than known devices. However for reasons of strength or improved covering of the vertical walls during fabrication, it may be envisaged to make the layers (in particular the insulating layer that is moreover of low thermal conductivity) of larger thickness. The total diameter of the nanowire can then reach 250 nm. The total diameter is preferably smaller than 250 nm.

A detector preferably comprises several membranes 1 achieving measuring pixels arranged more conventionally in the form of a matrix. Membranes 1 are then connected by nanowire cores 9 to a common connection pad arranged at substrate level. Common pad is connected a terminal of the power supply. External layers 11 of the nanowires are further individually connected a corresponding connection pad 16*b* connected to another power supply terminal.

Depending on the radiation wavelength involved, the detector can work both in the close infrared (wavelengths from 0.7 to 5 microns) or medium infrared (from 5 to 30 microns), in the visible (wavelengths comprised between 400 and 700 nm), as well as in the ultraviolet and below (wavelengths comprised between 10 and 400 nm).

To improve the thermal insulation of the membrane, the whole detector can be placed in a vacuum or in a gas at very low pressure, behind a window transparent to the radiation considered.

The detector can also comprise cooling means in order to reduce the thermal noise. The substrate can also be kept at a temperature determined using Peltier effect elements to increase the precision and reproducibility of the detector.

The use of a coaxial nanowire as single interconnect element for each membrane presents a large number of advantages compared with a configuration with at least two insulation arms and with support pillars. The major advantage results from the high integration due to the extremely reduced size of the single support of the absorbent membrane. The coaxial nature of the nanowire acting as support for the membrane enables a single nanowire to be used per membrane. The detector described above consequently has a good thermal insulation of the thermometer, a good filling factor of the elementary point and an ability to achieve elementary detectors with a very small pitch (down to half the wavelength of the radiation to be measured), as the size of the single nanowire supporting each membrane is consistent with the size of the membrane.

The invention claimed is:

1. An electromagnetic radiation detector comprising at least one radiation absorption membrane transforming the absorbed energy into heat transmitted to at least one resistive thermometer having a resistance varying with temperature, the membrane being suspended above a substrate by support means constituting nanowire-based electrical connection means, wherein for each membrane the support means comprise a nanowire connected to an area of said membrane, the nanowire having an electrically conducting core (9) and an electrically conducting external layer electrically insulated from one another and respectively connected to distinct measuring areas of the corresponding thermometer.

2. The detector according to claim 1, wherein the core and the external layer of the nanowire are respectively connected to two electrically conducting parts forming the membrane, one of the parts being electrically insulated from the other part by an electrically insulating layer, the electrically insulating layer comprising at least one opening facing each part, the thermometer being arranged on the electrically insulating layer and in electrical contact with the two parts at the level of said openings forming measuring areas.

3. The detector according to claim 2, wherein the core and the external layer are respectively connected to the conducting part by thermal insulation arms, said arms being electrically conducting and made from the same material as said parts.

4. The detector according to claim 1, wherein the thermometer is formed by two strips connected to the measuring areas.

5. The detector according to claim 1, comprising at least one electrically insulating membrane through the center whereof the core of the nanowire passes, an electrically conducting layer forming the external layer of the nanowire and surrounding the electrically insulating membrane to form the absorption membrane and the thermometer, in contact with the core of the nanowire above the electrically insulating membrane.

6. A method for producing a detector according claim 5, comprising the following successive steps:

creation of connection pads at the level of the substrate,
deposition of a droplet of catalyst on each connection pad,
growth of the nanowire cores,
formation of an electrical insulation layer on the core of each nanowire,
deposition of a polymer resin wherein the nanowire cores covered with the electrical insulation layer are embedded,
planarization,
releasing the free ends of the nanowire cores,
deposition and patterning of an electrically insulating layer constituting the electrically insulating membrane associated with each nanowire,
removal of the polymer resin,
formation of the electrically conducting external layer of each nanowire and of the thermometer.

7. The method according to claim 6, wherein the thermometer is formed on the membrane before deposition of the external layer.

8. The method according to claim 6, wherein the external layer is formed by a deposition covering each nanowire and a part of the associated membrane, the thermometer being formed in a location after etching of said layer.

9. The detector according to claim 1, wherein a plurality of absorption membranes are arranged in the form of a matrix and are connected by the core of the nanowires to electrical connection pads at the level of the substrate, the external layers of the nanowires, being connected at the level of the substrate.

10. The method according to claim 6, wherein formation of the electrical insulation layer on the core of the nanowires is performed by oxidation or deposition of silicon oxide.

11. The detector according to claim 1, wherein the absorption membrane is electrically insulating and supports the thermometer, the core of the nanowire which is in electrical contact with the thermometer passing through the center of said membrane, an electrically conducting layer forming the external layer of the nanowire and covering a part of the membrane to come into contact with the thermometer at the periphery of the latter.

12. The detector according to claim 1, wherein the core and the external layer are made from metal or a strongly doped semiconductor chosen from Si, Ge, GaAs, InP, and GaN.

13. The detector according to claim 1, wherein the nanowire has a total diameter of less than 250 nm.

14. The method according to claim 6, wherein the external layer and the thermometer are formed by deposition of a single layer.

* * * * *